United States Patent
Passebecq

(10) Patent No.: US 6,973,724 B1
(45) Date of Patent: Dec. 13, 2005

(54) METHOD FOR MAKING A TUBULAR ELEMENT AND RESULTING TUBULAR ELEMENT

(75) Inventor: Ghislain Passebecq, Trappes (FR)

(73) Assignees: Valeo, Paris (FR); Visteon Systemes Interieurs, La Defense (FR)

( * ) Notice: Subject to any disclaimer, the term of this patent is extended or adjusted under 35 U.S.C. 154(b) by 480 days.

(21) Appl. No.: 10/031,587

(22) PCT Filed: Jul. 21, 2000

(86) PCT No.: PCT/FR00/02111

§ 371 (c)(1),
(2), (4) Date: Jun. 6, 2002

(87) PCT Pub. No.: WO01/07179

PCT Pub. Date: Feb. 1, 2001

(30) Foreign Application Priority Data

Jul. 23, 1999  (FR) .................................. 99/09753

(51) Int. Cl.[7] ............................................ B21D 53/88
(52) U.S. Cl. .................... 29/897.2; 29/505; 29/524; 138/158; 138/162; 72/48; 72/370.1; 296/190.09
(58) Field of Search .............................. 29/897.2, 505, 29/509, 510, 515, 521, 508, 524, 897.312; 72/48, 370.1; 138/158, 162; 454/69, 104; 296/187.09, 190.09

(56) References Cited

U.S. PATENT DOCUMENTS

| | | | |
|---|---|---|---|
| 3,109,670 A | * 11/1963 | Engel | 285/114 |
| 3,726,000 A | * 4/1973 | Hafner | 29/21.1 |
| 3,757,830 A | 9/1973 | Anderson et al. | |
| 3,928,996 A | * 12/1975 | Molino | 72/129 |
| 4,183,557 A | * 1/1980 | Hinden | 285/53 |
| 4,558,892 A | * 12/1985 | Daw et al. | 285/331 |
| 4,865,365 A | * 9/1989 | Meinig | 285/412 |
| 4,955,570 A | 9/1990 | Benz et al. | |
| 6,471,256 B1 | * 10/2002 | Fischer | 285/424 |

FOREIGN PATENT DOCUMENTS

DE  44 20 070  2/1995

* cited by examiner

Primary Examiner—David P. Bryant
Assistant Examiner—Stephen Kenny
(74) Attorney, Agent, or Firm—Young & Thompson

(57) ABSTRACT

A method for making a tubular element, in particular a motor vehicle front cross member (1), for forming at least an air conduit (2,3,4) including at least two half-shells (5,6) assembled on two outer longitudinal edges (5a, 6a–5b, 6b), facing each other, with punctiform mechanical bond elements (7). The method further comprises the production of sealing elements (8) for the tubular element (1) consisting of at least a continuous convex or concave deformation simultaneously produced on each of the outer longitudinal edges (5a, 6a–5b, 6b) facing the two half-shells (5 and 6), in the proximity of the mechanical bond elements (7).

6 Claims, 1 Drawing Sheet

METHOD FOR MAKING A TUBULAR ELEMENT AND RESULTING TUBULAR ELEMENT

Figure 1:
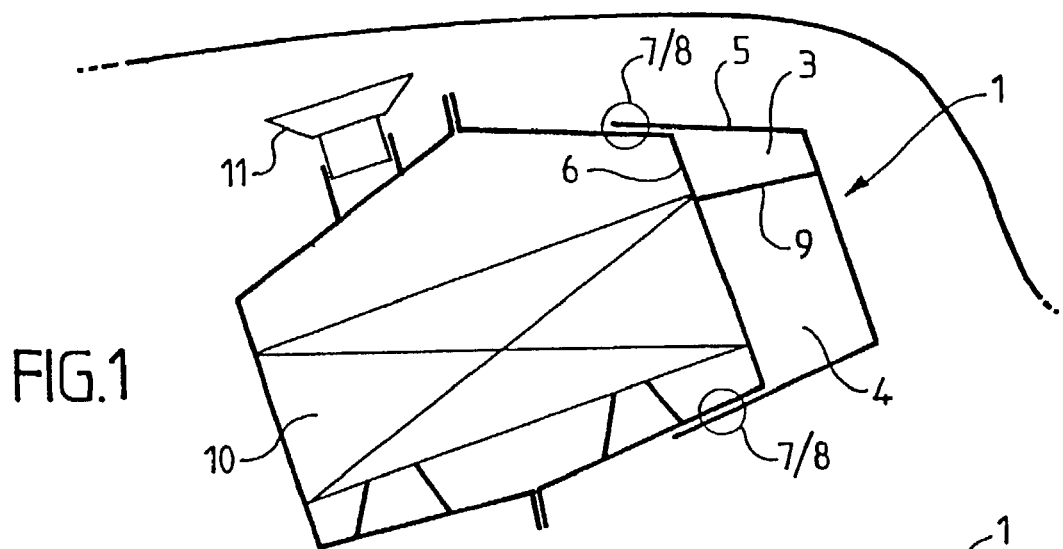

The present invention relates to a method of manufacturing a tubular element.

It will find an application, for example, in constituting a motor-vehicle front crosspiece, deliberately designed to be hollow, in such a way as not only to reinforce the passenger compartment of the vehicles transversely, but also to facilitate the installation of an air-conditioning unit, especially, and advantageously to define one or more air ducts, such as ducts for deicing the windscreen and/or for ventilating the passenger compartment of the vehicle.

The crosspieces of this type consist, in a known way, of at least two half-shells assembled together by way of two outer, facing longitudinal edges, emerging from the two half-shells, these longitudinal edges being joined together by local mechanical-linking means, such as staples, rivets, spot welds, etc.

It will be understood that such a method of assembly at individual points does not make it possible to obtain the leaktightness of a duct the role of which should be to transport air. In fact, the air easily infiltrates between the longitudinal edges of the shells, which have been left free between two consecutive assembling points.

In order to avoid such a drawback, it is known to produce this type of crosspiece from a profiled section obtained by extrusion. This solution, although giving excellent results, nevertheless presents the drawback of making it necessary to have recourse to more sophisticated techniques, and is consequently reserved only for vehicles the structure of which allows it.

Other known solutions may come to mind for solving the problem posed, such as crimping the ends of the two outer longitudinal edges of the half-shells onto each other, for example.

It is also possible to form a longitudinal weld bead on the same longitudinal edges, or else to interpose a flexible gasket between them, and to carry out an operation of spot welding, in such a way as to obtain the required leaktightness.

However, all these solutions have the drawback of being expensive to implement due to the very nature of the processes, entailing the use of specific hardware and requiring lengthy labour times.

The object of the present invention is to remedy these various drawbacks, by proposing a method which is simple in its implementation and inexpensive.

To that end, the invention relates to a method of manufacturing a tubular element, especially a motor-vehicle front crosspiece, able to constitute at least one air duct, of the type comprising at least two half-shells assembled onto two facing outer longitudinal edges, by local mechanical-linking means, characterised in that it further incorporates the production of leaktightness means of the said tubular element which consist of at least one continuous, convex or concave deformation, formed simultaneously on each of the facing outer longitudinal edges of the two half-shells, in the vicinity of the mechanical-linking means.

The present invention also relates to the characteristics which will emerge in the course of the description which will follow and which should be considered in isolation or according to all their technically possible combinations.

Figures 2, 3:
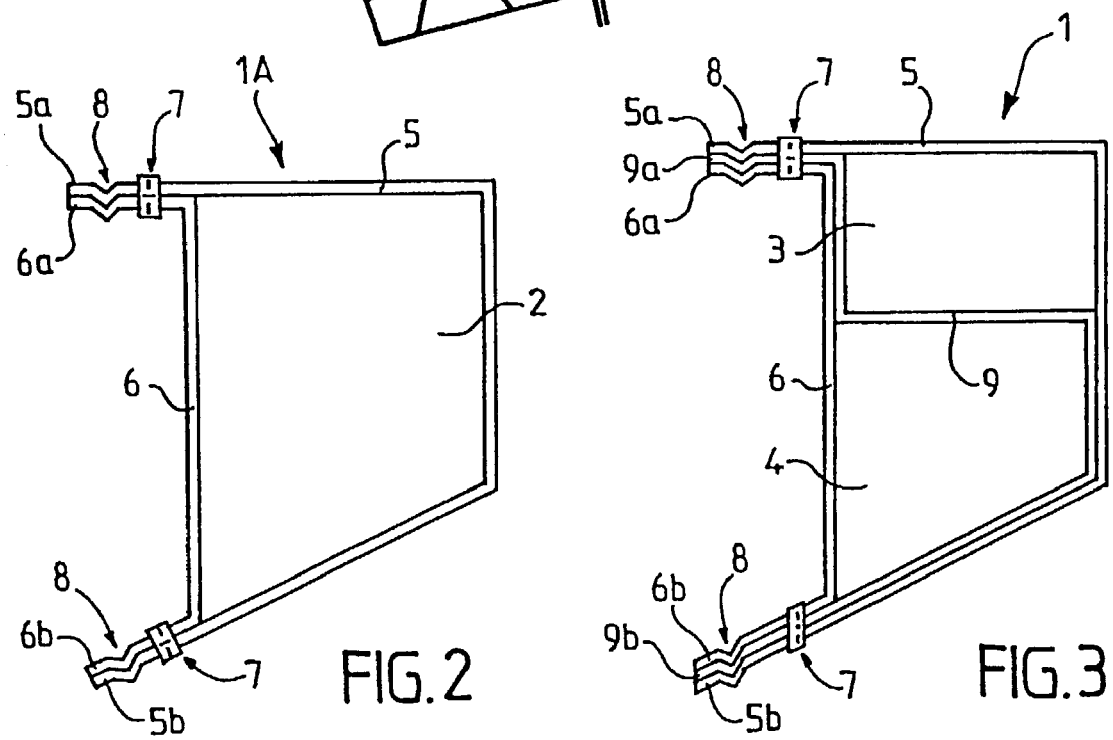
Figure 4:
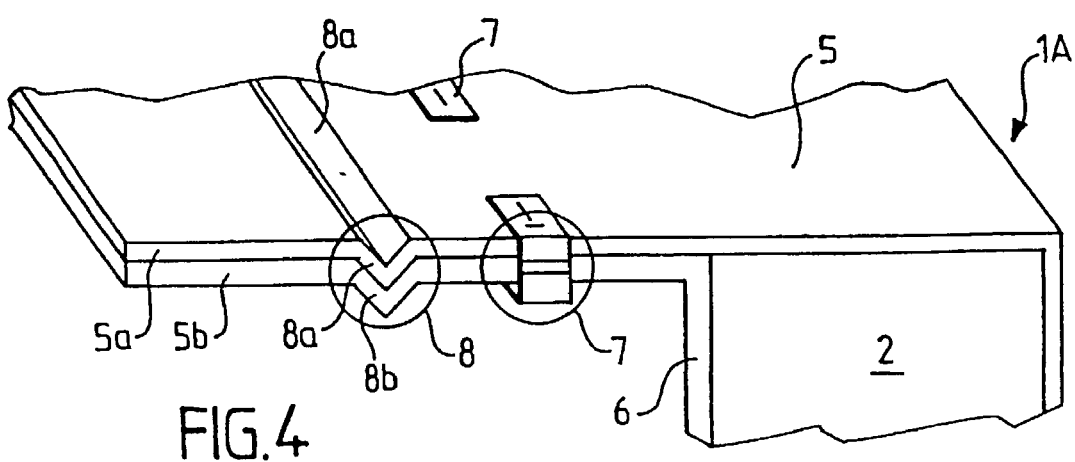

This description, given by way of non-limiting example, will give a better understanding of how the invention can be implemented, by reference to the attached drawings, among which:

FIG. 1 is a diagrammatic representation in cross-section of a motor-vehicle crosspiece integrated into a dashboard, FIG. 2 is a view in cross-section of a crosspiece according to a first embodiment example, FIG. 3 is a diagrammatic view in cross-section of a crosspiece according to a second embodiment example possibly corresponding to that of FIG. 1, FIG. 4 is a view on an enlarged scale, in perspective, of the assembly and leaktightness region of a crosspiece according to one of the examples of FIGS. 2 and 3.

The method according to the invention applies to the manufacture of a tubular element in general. In particular, according to the present example, the method allows the production of a motor-vehicle u front nd crosspiece 1 which, moreover, is able to constitute one or two air ducts.

Thus, according to the example of FIGS. 1 and 3, the crosspiece 1 constitutes a first deicing duct 3 and a second ventilation duct 4 whereas, according to a simplified example, represented in FIG. 2, the crosspiece constitutes only a ventilation duct 2. However, the invention applies as much to one or the other of the cases.

According to the example of FIG. 2, the crosspiece 1A consists of two half-shells 5 and 6, assembled to each other by way of two outer longitudinal edges 5a, 6a–5b, 6b, produced face-to-face and in fact consisting of extensions of the sides of the half-shells 5 and 6. These are arranged with respect to one another so as to define the air duct 2.

They are assembled by local mechanical-linking means, especially by "clinching", in fact constituting tacking by mechanical deformation of the materials. Needless to say, other local mechanical-linking means could be envisaged such as the fitting of rivets, for example, or else the forming of spot welds.

The method according to the invention, in addition to the mechanical-linking means which have just been quoted, incorporates the production of leaktightness means 8 associated with the said local mechanical-linking means. These consist of at least one continuous, convex or concave deformation, produced simultaneously on each of the facing outer longitudinal edges 5a, 6a–5b, 6b of the two half-shells 5 and 6. These leaktightness means are advantageously produced in the vicinity of the mechanical-linking means 7.

Although these leaktightness means 8 could be associated with any mechanical-linking means, provided they are local means, preference will advantageously be given to mechanical-linking means obtained especially by tacking, by mechanical deformation known as "clinching" in such a way that the continuous, concave or convex, deformation 8 of the lateral edges 5a, 6a–5b, 6b can be obtained simultaneously with the said mechanical-linking or clinching means 7, in the course of a single stamping operation, while separating their respective function of leaktightness and of assembling.

The concave or convex leaktightness deformation 8 produced on each of the outer longitudinal edges 5a, 6a–5b, 6b of the two half-shells 5 and 6 is obtained by way of a stamping punch, especially a V-shaped punch (not represented), deforming the said edges simultaneously in order to obtain two profiles 8a, 8b matching each other perfectly and of corresponding shapes to that of the punch.

Furthermore, such a deformation, in addition to the leaktightness sought, achieves increased rigidity in this region, since the deformation 8 also constitutes a rib.

The two half-shells 5 and 6, constituting the tubular element or crosspiece 1, are obtained by stamping from sheet steel, aluminium, magnesium, or other materials, especially metallic materials, according to defined and complementary profiles.

According to the example of FIG. 3, the tubular element 1A is a motor-vehicle front crosspiece, of which the half-shells 5, 6 and an intermediate element 9 constituting it are shaped in such a way as to define two air ducts 3 and 4, which are independent of one another, for example one for deicing, the other for ventilation.

In fact, the embodiment of FIG. 3 differs essentially with respect to that of FIG. 2 in that an intermediate element 9 is interposed between the half-shells 5 and 6, these end edges 9a, 9b being interposed between the edges 5a and 6a, on the one hand, and the edges 5b, 6b, on the other hand, of the half-shells 5 and 6.

Although what is involved is a crosspiece 1a according to FIG. 2, including a single air duct 2, or a crosspiece 1 according to FIG. 3 including two air ducts 3 and 4, the said crosspiece is designed in such a way as also to accommodate any type of apparatus, such as an air-conditioning unit 10, for example, a loudspeaker 11, etc.

What is claimed is:

1. Method of manufacturing a tubular element, especially a motor-vehicle front crosspiece (1), able to constitute at least one air duct (2, 3, 4), of the type comprising at least two half-shells (5, 6) assembled onto two facing outer longitudinal edges (5a, 6a–5b, 6b), by local mechanical-linking means (7), characterised in that it further incorporates the production of leaktightness means (8) of the said tubular means (1) which consist of at least one continuous, convex or concave deformation formed simultaneously on each of the facing outer longitudinal edges (5a, 6a–5b, 6b) of the two half-shells (5 and 6), in the vicinity of the mechanical-linking means (7).

2. Method according to claim 1, characterised in that the mechanical-linking means, consisting of local mechanical deformations (7), and the continuous, concave or convex deformation (8) of the lateral edges (5a, 6a–5b, 6b), forming the leaktightness means, are obtained simultaneously in the course of a single stamping operation, while separating their respective functions of leaktightness and of assembling.

3. Method according to claim 1, characterised in that the two half-shells (5 and 6) constituting the tubular element or crosspiece (1, 1A) are obtained by stamping from sheet steel, aluminium or magnesium, according to defined and complementary profiles.

4. Method according to claim 1, characterised in that the concave or convex leaktightness deformation (8) produced on each of the outer longitudinal edges (5a, 6a–5b, 6b) of the two half-shells (5 and 6) is obtained by way of a V-shaped stamping punch, deforming the said edges simultaneously in order to obtain two profiles (8a, 8b) matching each other perfectly and of corresponding shapes.

5. Method according to claim 1, characterised in that the tubular element (1A) is a motor-vehicle front crosspiece, of which the half-shells (5, 6, 9) constituting it are shaped in such a way as to define two air ducts (3 and 4), which are independent of one another, for example one for deicing, the other for ventilation.

6. Motor-vehicle front crosspiece, providing at least one duct comprising at least two half-shells assembled along two facing outer longitudinal edges, by local mechanical-linking means, and leaktightness means which consist of at least one continuous, convex or concave deformation on each of the facing outer longitudinal edges of the two half-shells, adjacent the mechanical-linking means.

\* \* \* \* \*